United States Patent
Sekiya

(10) Patent No.: US 10,809,105 B2
(45) Date of Patent: Oct. 20, 2020

(54) MEASURING INSTRUMENT AND PROCESSING APPARATUS

(71) Applicant: DISCO CORPORATION, Tokyo (JP)

(72) Inventor: Kazuma Sekiya, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 303 days.

(21) Appl. No.: 16/025,024

(22) Filed: Jul. 2, 2018

(65) Prior Publication Data

US 2019/0011298 A1   Jan. 10, 2019

(30) Foreign Application Priority Data

Jul. 5, 2017 (JP) ................................. 2017-132103

(51) Int. Cl.
| | | |
|---|---|---|
| *G01F 1/66* | (2006.01) | |
| *B24D 3/00* | (2006.01) | |
| *B24B 1/00* | (2006.01) | |
| *G01F 15/02* | (2006.01) | |

(52) U.S. Cl.
CPC ................. *G01F 1/66* (2013.01); *B24B 1/00* (2013.01); *B24D 3/001* (2013.01); *G01F 1/668* (2013.01); *G01F 15/022* (2013.01); *G01N 2291/02836* (2013.01)

(58) Field of Classification Search
USPC ......................................................... 702/45
See application file for complete search history.

(56) References Cited

U.S. PATENT DOCUMENTS

| | | | | |
|---|---|---|---|---|
| 4,810,100 A | * | 3/1989 | Shavit .................... | G01K 11/24 165/270 |
| 2002/0062681 A1 | * | 5/2002 | Livingston ........... | G01N 29/326 73/24.01 |
| 2002/0105999 A1 | * | 8/2002 | Wallen .................... | G01K 11/24 374/117 |
| 2003/0136193 A1 | * | 7/2003 | Fujimoto ................ | G01F 1/668 73/597 |
| 2007/0108871 A1 | * | 5/2007 | Asada .................... | G01N 29/07 310/320 |
| 2009/0019945 A1 | * | 1/2009 | Matsushita ............. | G01F 1/668 73/861.28 |
| 2013/0269447 A1 | * | 10/2013 | Takemura ................. | G01F 1/66 73/861.27 |
| 2014/0311253 A1 | * | 10/2014 | Iwasa ...................... | G01F 1/667 73/861.21 |

(Continued)

FOREIGN PATENT DOCUMENTS

| | | |
|---|---|---|
| JP | 2003257905 A | 9/2003 |
| JP | 2010194672 A | 9/2010 |

(Continued)

*Primary Examiner* — Paul D Lee
(74) *Attorney, Agent, or Firm* — Greer Burns & Crain Ltd.

(57) ABSTRACT

A measuring instrument disposed on a pipe through which a liquid flows includes two ultrasonic vibrators disposed on an upstream side and a downstream side of the pipe, and an ultrasonic conductor disposed between the ultrasonic vibrators and held in contact with the liquid. The measuring instrument derives the temperature of the liquid in contact with the ultrasonic conductor by generating ultrasonic waves from one of the ultrasonic vibrators and observing the ultrasonic waves propagated through the ultrasonic conductor with the other of the ultrasonic vibrators.

6 Claims, 7 Drawing Sheets

(56) References Cited

U.S. PATENT DOCUMENTS

2015/0082912 A1\* 3/2015 Suzuki .................... G01F 1/667
                                                      73/861.28
2017/0167372 A1\* 6/2017 Akita ...................... G01F 1/667

FOREIGN PATENT DOCUMENTS

| JP | 2011007763 A | 1/2011 |
| JP | 2015206593 A | 11/2015 |

\* cited by examiner

MEASURING INSTRUMENT AND PROCESSING APPARATUS

BACKGROUND OF THE INVENTION

Field of the Invention

The present invention relates to a measuring instrument for ultrasonically measuring a liquid flowing through a pipe and a processing apparatus incorporating such a measuring instrument.

Description of the Related Art

In a processing apparatus including a processing unit for processing a workpiece, the workpiece and the processing unit are supplied with any of various liquids. The processing apparatus is provided with a supply source for supplying a liquid, an ejection port for ejecting the liquid, and a pipe that connects the supply source and the ejection port to each other. In order to make the processing apparatus operate appropriately, the liquid is controlled to flow at a predetermined temperature and concentration through the pipe at a predetermined flow rate and speed. There is known an ultrasonic flowmeter to be disposed on the pipe as a measuring instrument for measuring the flow rate and speed of the liquid in the pipe (see, for example, Japanese Patent Laid-open No. 2011-7763 and Japanese Patent Laid-open No. 2015-206593). The ultrasonic flowmeter measures the flow rate and speed of a liquid that flows in a pipe by propagating ultrasonic waves through the liquid to be measured and comparing the speed of the ultrasonic waves that are propagated from an upstream side to a downstream side and the speed of the ultrasonic waves that are propagated from the downstream side to the upstream side.

Liquids that are used in processing apparatus include, for example, pure water, a slurry that is a suspension of solid particles dispersed in a medium or a suspension liquid, an acid solution, an alkaline solution, and other solutions. Processing apparatus that use such various liquids are widely known in the art (see, for example, Japanese Patent Laid-open No. 2003-257905 and Japanese Patent Laid-open No. 2010-194672).

SUMMARY OF THE INVENTION

Various liquids have their actions variable by temperature. Since the temperature of the liquid used in a processing apparatus has a large effect on the processing operation thereof, it is necessary to manage the temperature of the liquid in detail. However, even though the temperature of the liquid is managed at a supply source of the liquid which is included in the processing apparatus, the temperature of the liquid may vary en route while the liquid is supplied to a destination spot where a workpiece is to be processed in the processing apparatus. If the temperature of the liquid supplied to the destination spot is not a predetermined temperature set for processing the workpiece, then the workpiece may not be processed as desired. Accordingly, there is a demand for some means for confirming the temperature of the liquid immediately before the liquid is supplied to the workpiece. Since an ultrasonic flowmeter disposed on a pipe through which a liquid flows is unable to measure the temperature of the liquid in the pipe, one solution would be to add a thermometer to the pipe. However, installing the thermometer on the pipe would be a costly task. Furthermore, the processing apparatus may not have an extra space large enough to install the thermometer therein. It is therefore an object of the present invention to provide a measuring instrument that has the functions of both an ultrasonic flowmeter and a thermometer.

In accordance with an aspect of the present invention, there is provided a measuring instrument adapted to be disposed on a pipe through which a liquid flows, including two ultrasonic vibrators disposed on an upstream side and a downstream side of the pipe, an ultrasonic conductor disposed between the two ultrasonic vibrators and held in contact with the liquid, and a controller electrically connected to the two ultrasonic vibrators. The controller includes a first relationship register registering therein the relationship between propagation speeds of ultrasonic waves in the ultrasonic conductor and temperatures of the ultrasonic conductor, an ultrasonic wave propagation time calculator, a first ultrasonic wave propagation speed calculator, and a temperature calculator. The ultrasonic wave propagation time calculator calculates the propagation time of ultrasonic waves propagated in the ultrasonic conductor as a first propagation time from waveform information that is obtained when the ultrasonic waves are generated by one of the two ultrasonic vibrators, propagated through the ultrasonic conductor, and observed by the other of the two ultrasonic vibrators. The first ultrasonic wave propagation speed calculator calculates the propagation speed of the ultrasonic waves in the ultrasonic conductor, using the first propagation time and the length of a propagation path for the ultrasonic waves. The temperature calculator derives the temperature of the liquid held in contact with the ultrasonic conductor by calculating the temperature of the ultrasonic conductor from the calculated propagation speed of the ultrasonic waves in the ultrasonic conductor and the relationship registered in the first relationship register.

Preferably, the controller further includes a second relationship register registering therein the relationship between temperatures of the liquid, propagation speeds of ultrasonic waves in the liquid, and concentrations of a substance dissolved in or mixed with the liquid, a second ultrasonic wave propagation speed calculator, and a concentration calculator. The ultrasonic wave propagation time calculator calculates the first propagation time and calculates the propagation time of ultrasonic waves as a second propagation time when the ultrasonic waves are generated by the one of the two ultrasonic vibrators, propagated through the liquid, and observed by the other of the two ultrasonic vibrators. The ultrasonic wave propagation time calculator calculates the propagation time of ultrasonic waves propagated in the liquid as a third propagation time from waveform information that is obtained when the ultrasonic waves are generated by the other of the two ultrasonic vibrators, propagated through the liquid, and observed by the one of the two ultrasonic vibrators. The second ultrasonic wave propagation speed calculator calculates the propagation speed of the ultrasonic waves in the liquid from the second propagation time, the third propagation time, and the distance between the two ultrasonic vibrators. The concentration calculator calculates the concentration of the substance in the liquid from the temperature of the liquid calculated by the temperature calculator, the propagation speed of the ultrasonic waves in the liquid calculated by the second ultrasonic wave propagation speed calculator, and the relationship registered in the second relationship register.

Preferably, furthermore, the controller further includes a flow speed calculator, and a flow rate calculator. The flow speed calculator calculates a flow speed of the liquid in the pipe, using the second propagation time, the third propagation time, and the distance between the two ultrasonic vibrators. The flow rate calculator calculates a flow rate of the liquid from the flow speed of the liquid in the pipe calculated by the flow speed calculator and a cross-sectional area of the pipe.

According to another aspect of the present invention, the ultrasonic conductor may be an annular member that makes up an inner wall of the pipe between the two ultrasonic vibrators, and the annular member may be covered in a cover member that restrains the transfer of heat from an external atmosphere in which the pipe is disposed. Alternatively, the ultrasonic conductor may be an elongate member extending in the pipe between the two ultrasonic vibrators, and the ultrasonic conductor may be disposed such that a surface thereof is held in contact with the liquid.

In accordance with still another aspect of the present invention, there is provided a processing apparatus including a measuring instrument disposed on a pipe through which a liquid flows, a chuck table, and a processing tool. The measuring instrument includes two ultrasonic vibrators disposed on an upstream side and a downstream side of the pipe, an ultrasonic conductor disposed between the two ultrasonic vibrators and held in contact with the liquid, and a controller electrically connected to the two ultrasonic vibrators. The controller includes a first relationship register registering therein the relationship between propagation speeds of ultrasonic waves in the ultrasonic conductor and temperatures of the ultrasonic conductor, an ultrasonic wave propagation time calculator, a first ultrasonic wave propagation speed calculator, and a temperature calculator. The ultrasonic wave propagation time calculator calculates the propagation time of ultrasonic waves propagated in the ultrasonic conductor as a first propagation time from waveform information that is obtained when the ultrasonic waves are generated by one of the two ultrasonic vibrators, propagated through the ultrasonic conductor, and observed by the other of the two ultrasonic vibrators. The first ultrasonic wave propagation speed calculator calculates the propagation speed of the ultrasonic waves in the ultrasonic conductor, using the first propagation time and the length of a propagation path for the ultrasonic waves. The temperature calculator derives the temperature of the liquid held in contact with the ultrasonic conductor by calculating the temperature of the ultrasonic conductor from the calculated propagation speed of the ultrasonic waves in the ultrasonic conductor and the relationship registered in the first relationship register. The processing tool processes a workpiece held on the chuck table while the liquid whose flow rate and concentration have been measured by the measuring instrument is being supplied to the workpiece.

The measuring instrument according to the aspect of the present invention is disposed on a pipe through which a liquid flows. The measuring instrument includes two ultrasonic vibrators disposed on an upstream side and a downstream side of the pipe, an ultrasonic conductor disposed between the two ultrasonic vibrators and held in contact with the liquid, and a controller electrically connected to the two ultrasonic vibrators. The controller includes a first relationship register registering therein the relationship between propagation speeds of ultrasonic waves in the ultrasonic conductor and temperatures of the ultrasonic conductor. The controller of the measuring instrument controls one of the two ultrasonic vibrators of the measuring instrument to generate ultrasonic waves, and also controls the other of the two ultrasonic vibrators to observe the ultrasonic waves from the one of the two ultrasonic vibrator. Then, the propagation speed of the ultrasonic waves in the ultrasonic conductor is calculated from a waveform information that is obtained when the ultrasonic waves generated by the one of the ultrasonic vibrators are observed by the other of the ultrasonic vibrators. The temperature of the ultrasonic conductor is calculated from the relationship between the propagation speed of ultrasonic waves in the ultrasonic conductor and the relationship registered in the first relationship register. Since the ultrasonic conductor is held in contact with the liquid flowing in the pipe, the temperature of the ultrasonic conductor is regarded as agreeing with the temperature of the liquid.

The measuring instrument that functions as both an ultrasonic flowmeter disposed on a pipe and a thermometer. Since the measuring instrument can be disposed in place of an ultrasonic flowmeter on the pipe, the measuring instrument can easily be disposed in a limited space in a processing apparatus. According to the present invention, the measuring instrument that has the functions of both an ultrasonic flowmeter and a thermometer is provided.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
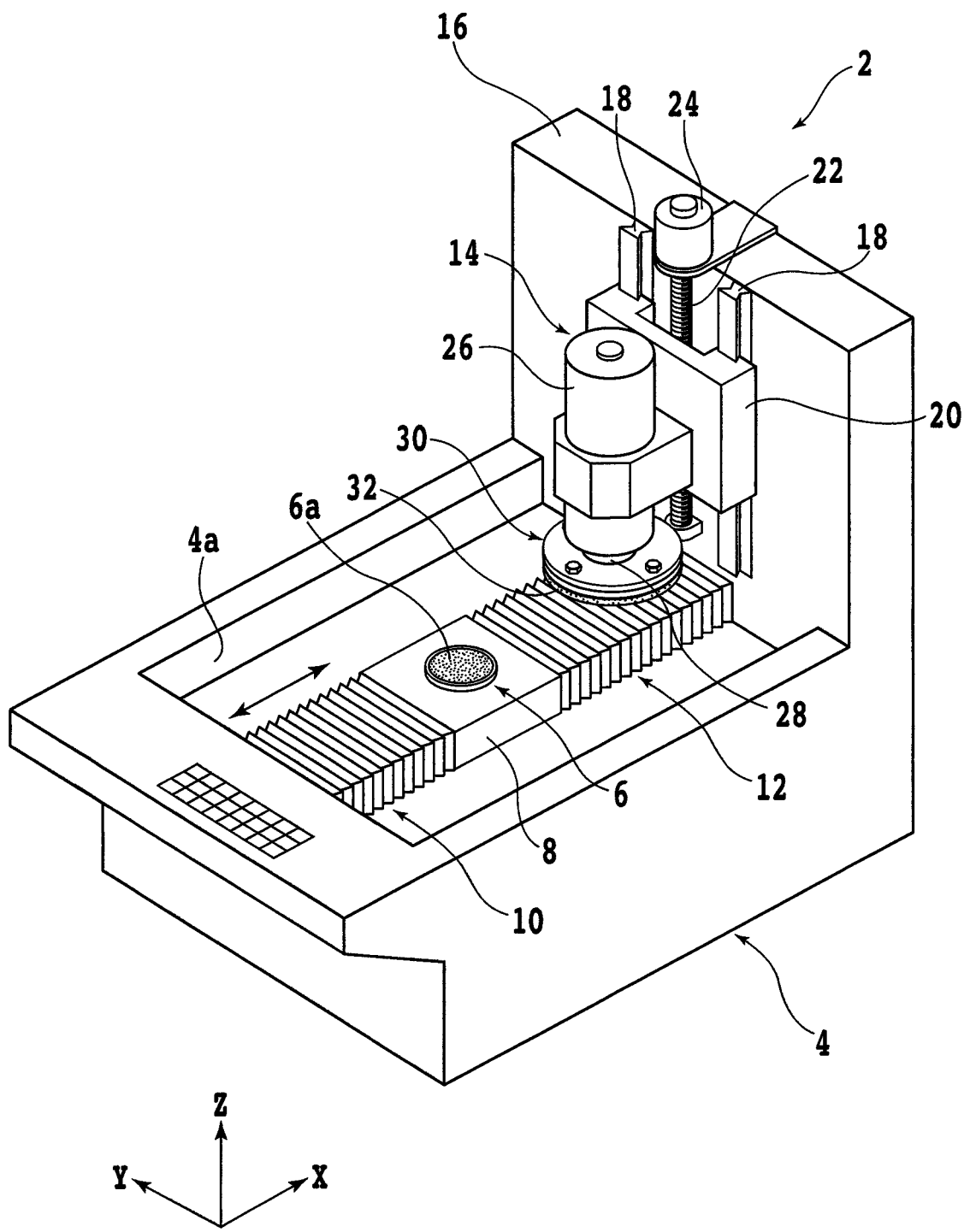
FIG. 1 is a perspective view schematically depicting a processing apparatus that incorporates a measuring instrument according to the present invention.

Like or corresponding parts are denoted by like or corresponding reference characters throughout views.

A measuring instrument according to a preferred embodiment of the present invention will be described below. The measuring instrument according to the preferred embodiment of the present invention is disposed on a pipe through which a liquid flows to a destination spot in a processing apparatus for processing a workpiece such as a semiconductor wafer or the like. The liquid is supplied through the pipe to a processing unit that processes the workpiece and the workpiece itself at the destination spot. The liquid is, for example, pure water, a slurry that is a suspension of solid particles dispersed in a medium or a suspension liquid, an acid solution, an alkaline solution, or any of other solutions. The processing apparatus that includes the pipe, the measuring instrument, and the processing unit will be described below with reference to FIG. 1. FIG. 1 depicts in perspective a polishing apparatus 2, which serves as the processing apparatus, for polishing a workpiece such as a semiconductor wafer or the like.

As depicted in FIG. 1, the polishing apparatus 2 includes a base 4 with an opening 4a defined in an upper surface thereof. The opening 4a houses therein an X-axis moving table 8 having an upper surface that supports thereon a chuck table 6 for holding the workpiece under suction thereon. The X-axis moving table 8 is movable along X-axis directions by an X-axis moving mechanism, not depicted, selectively between and positionable in a loading/unloading area 10 where the workpiece is loaded onto or unloaded from the chuck table 6 and a processing area 12 where the workpiece is polished on the chuck table 6. The chuck table 6 has an upper surface serving as a holding surface 6a for holding the workpiece thereon. The chuck table 6 has a suction passage, not depicted, defined therein whose one end is held in fluid communication with the holding surface 6a and whose other end is connected to a suction source, not depicted. When the suction source is actuated, it produces a negative pressure that acts through the suction passage on the workpiece on the holding surface 6a, holding the workpiece under suction on the holding surface 6a, i.e., the chuck table 6. The chuck table 6 is rotatable about a central axis perpendicular to the holding surface 6a.

The polishing apparatus 2 includes a polishing unit 14, which serves as the processing unit, for polishing the workpiece. The polishing unit 14 is supported on an upstanding support wall 16 disposed at a rear end of the base 4. A pair of Z-axis guide rails 18 extending along Z-axis directions is mounted on a front surface of the support wall 16, and a Z-axis moving plate 20 is slidably mounted on the Z-axis guide rails 18. The Z-axis moving plate 20 has a nut, not depicted, disposed on a reverse side, i.e., a rear surface, thereof and threaded over a Z-axis ball screw 22 disposed between and extending parallel to the Z-axis guide rails 18. A Z-axis stepping motor 24 mounted on the upper end of the support wall 16 is coupled to the upper end of the Z-axis ball screw 22. When the Z-axis stepping motor 24 is energized, it rotates the Z-axis ball screw 22 about its own axis, moving the Z-axis moving plate 20 in one of the Z-axis directions along the Z-axis guide rails 18. The polishing unit 14 is fixedly mounted on a lower portion of a front surface of the Z-axis moving plate 20. When the Z-axis moving plate 20 is moved in one of the Z-axis directions, the polishing unit 14 is moved in the same Z-axis direction, which may be referred to as a processing feed direction.

Figure 2:
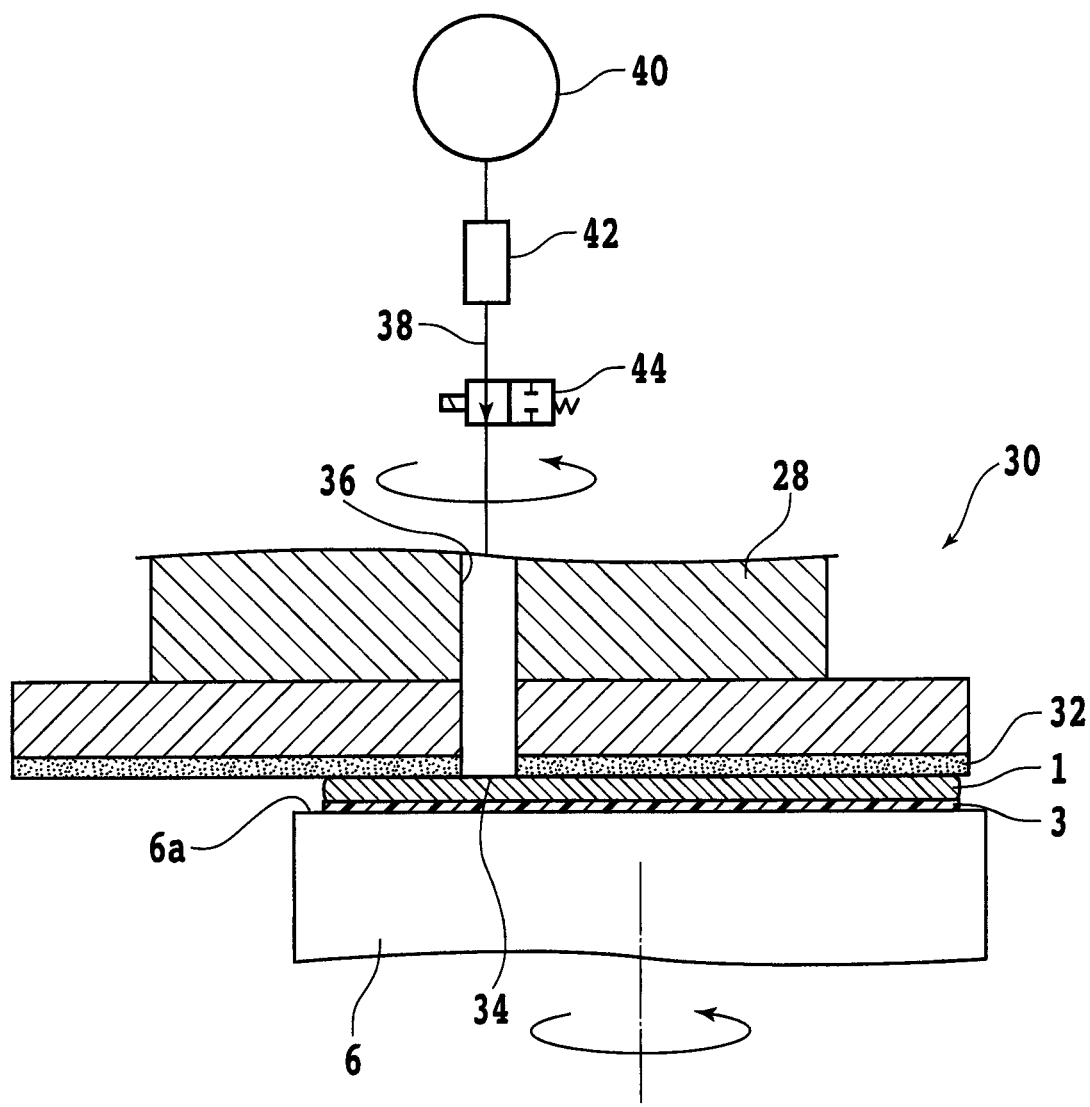
FIG. 2 is a fragmentary elevational view, partly in cross section, schematically depicting the manner in which a processing unit of the processing apparatus is processing a workpiece.

The polishing unit 14 includes a spindle 28 rotatable about its own axis by an electric motor, not depicted, coupled to a proximal end of the spindle 28, a polishing wheel 30 mounted on a distal end of the spindle 28 and rotatable in unison with the spindle 28, and a polishing pad 32 mounted on a lower surface of the polishing wheel 30. The electric motor is housed in a spindle housing 26 supported on the Z-axis moving plate 20. The polishing unit 14 will be described in greater detail later. FIG. 2 is a fragmentary elevational view, partly in cross section, schematically depicting the manner in which the processing unit is processing the workpiece, i.e., the polishing unit 14 is polishing the workpiece. As depicted in FIG. 2, for polishing the workpiece, denoted by 1, held under suction on the holding surface 6a of the chuck table 6, the chuck table 6 is rotated about its own axis and the polishing wheel 30 is lowered, i.e., processing-fed, while being rotated about its own axis. The polishing pad 32 on the rotating polishing wheel 30 is pressed against the upper surface, to be polished, of the workpiece 1, thereby polishing the workpiece 1.

The spindle 28 and the polishing wheel 30 have a liquid delivery passageway 36 defined therein which has a lower end connected to an ejection port 34 defined in the polishing pad 32 on the lower surface of the polishing wheel 30. The liquid delivery passageway 36 has an upper end connected through a pipe 38, which serves as the pipe referred to above, to a supply source 40 that stores a liquid to be supplied to the workpiece 1. The pipe 38 is provided with a flow switcher 44 for selectively starting to supply the liquid from the supply source 40 and stopping supplying the liquid from the supply source 40, and a measuring instrument 42, which serves as the measuring instrument referred to above, for measuring the liquid flowing through the pipe 38. When the workpiece 1 is to be polished, the flow switcher 44 is actuated to supply the liquid from the supply source 40 to the workpiece 1. The liquid is a slurry that is a suspension of solid particles dispersed in a medium, for example. The kind of the medium, the kind of the solid particles, and the shape and size of the solid particles are selected depending on the polishing process to be performed on the workpiece 1, the kind of the workpiece 1, etc. The liquid may alternatively be an alkaline mixture liquid in which a water-soluble organic material such as glycerin, ethylene glycol, or the like is added to an alkaline solution with sodium hydroxide, potassium hydroxide, or the like dissolved therein. The liquid stored in the supply source 40 has been prepared to match the polishing process to be performed on the workpiece 1.

The action of the liquid may vary depending on the temperature of the liquid. If the temperature of the liquid supplied to the workpiece 1 is not a predetermined temperature set for processing the workpiece, then the workpiece 1 may not be processed as desired. Even though the temperature of the liquid is managed at the supply source 40 of the liquid, the temperature of the liquid may vary en route while the liquid is supplied to the workpiece 1. The amount of solid particles included in the liquid is also an important factor for determining the properties of the liquid. Moreover, the dispersed solid particles may be localized as time elapses. The proportion of solid particles included in the liquid will hereinafter be referred to as "concentration" for the sake of convenience. In other words, therefore, the concentration may be localized in the liquid as time elapses. If the liquid supplied to the workpiece 1 is not of a predetermined concentration set for processing the workpiece, then the workpiece 1 may not be processed as desired. It would be preferable to add a thermometer for measuring the temperature of the liquid to the pipe 38 and also to add a concentration meter for measuring the concentration of the liquid to the pipe 38, so that the temperature and concentration of the liquid could be managed appropriately based on the measured data from the thermometer and the concentration meter. The pipe 38 may also be provided with a flowmeter for measuring the flow rate of the liquid. It is not easy to add all these pieces of measuring equipment individually to the pipe 38 within a limited space available in the polishing apparatus 2. In addition, as the number of pieces of measuring equipment added increases, the cost of the polishing apparatus 2 increases. According to the present invention, the measuring instrument 42, rather than individual pieces of measuring equipment, is disposed on the pipe 38.

Figure 3:
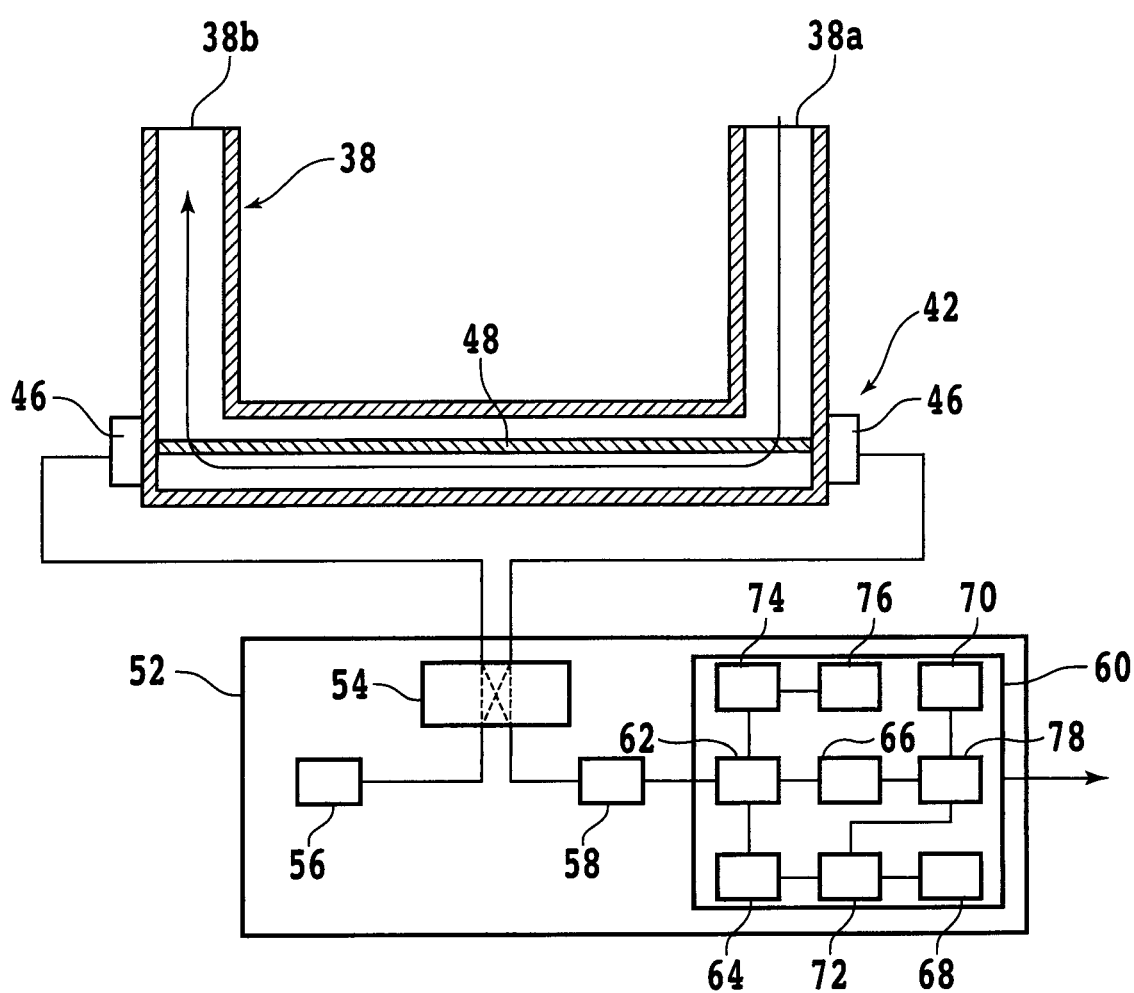
FIG. 3 is a cross-sectional view, partly in block form, schematically depicting a measuring instrument, disposed on a pipe, according to an embodiment of the present invention.

A measuring instrument 42 according to an embodiment of the present invention will be described below with reference to FIG. 3. FIG. 3 is a cross-sectional view, partly in block form, schematically depicting the measuring instrument 42, disposed on the pipe 38, according to the embodiment of the present invention. As depicted in FIG. 3, the measuring instrument 42 has two ultrasonic vibrators 46 disposed on an upstream side 38a and a downstream side 38b of the pipe 38. The two ultrasonic vibrators 46 are able to generate ultrasonic waves and also to observe ultrasonic waves propagated thereto. The measuring instrument 42 also has an ultrasonic conductor 48 extending between the two ultrasonic vibrators 46 and disposed in the pipe 38 in contact with the liquid flowing through the pipe 38. The ultrasonic conductor 48 is an elongate member extending in the pipe 38 between the two ultrasonic vibrators 46, for example. The ultrasonic conductor 48 is disposed such that its surface is in contact with the liquid. The ultrasonic conductor 48 is made of a metal through which ultrasonic waves can be propagated at a relatively high speed and which has a small specific heat capacity. Since the ultrasonic conductor 48 is in contact with the liquid flowing through the pipe 38, the temperature of the ultrasonic conductor 48 is almost the same as the temperature of the liquid.

When one of the two ultrasonic vibrators 46 generates ultrasonic waves, the generated ultrasonic waves are propagated to and through the liquid and the ultrasonic conductor 48. The ultrasonic waves that are propagated through the liquid and the ultrasonic conductor 48 are observed by the other of the two ultrasonic vibrators 46. At this time, the other ultrasonic vibrator 46 observes the ultrasonic waves propagated through the ultrasonic conductor 48 earlier than the ultrasonic waves propagated through the liquid. Similarly, the other of the two ultrasonic vibrators 46 can generate ultrasonic waves, and the generated ultrasonic waves can be observed by the one of the two ultrasonic vibrators 46.

The measuring instrument 42 further includes a controller 52 electrically connected to the two ultrasonic vibrators 46. The controller 52 controls the measuring instrument 42 to measure the liquid in the pipe 38. The controller 52 has a switcher 54 electrically connected to the two ultrasonic vibrators 46. The switcher 54 has a function to switch around the ultrasonic vibrator 46 that is to generate ultrasonic waves and the ultrasonic vibrator 46 that is to observe ultrasonic waves. The switcher 54 is electrically connected to a power supply 56, and connects the power supply 56 to one of the two ultrasonic vibrators 46 to cause the connected ultrasonic vibrator 46 to generate ultrasonic waves. The switcher 54 is also electrically connected to an amplifier 58, and connects the other of the two ultrasonic vibrators 46 to the amplifier 58. The ultrasonic waves that have reached the other ultrasonic vibrator 46 is converted thereby into an electric signal including waveform information, and the electric signal is sent to the amplifier 58.

The amplifier 58 is electrically connected to a calculation block 60 in the controller 52, and amplifies the electric signal including the waveform information and sends the amplified electric signal to the calculation block 60. The calculation block 60 includes an ultrasonic wave propagation time calculator 62, a first ultrasonic wave propagation speed calculator 64, a second ultrasonic wave propagation speed calculator 66, a first relationship register 68, a second relationship register 70, a temperature calculator 72, a flow speed calculator 74, a flow rate calculator 76, and a concentration calculator 78. The calculation block 60 calculates the temperature, flow speed, flow rate, concentration, etc. of the liquid flowing through the pipe 38 based on the waveform information.

The electric signal including the waveform information, which has been amplified by the amplifier 58, is sent to the ultrasonic wave propagation time calculator 62 of the calculation block 60. The ultrasonic wave propagation time calculator 62 analyzes the received electric signal, obtains the waveform information included in the electric signal, and calculates the propagation time of the ultrasonic waves propagated from the one of the ultrasonic vibrators 46 to the other. Specifically, the ultrasonic wave propagation time calculator 62 calculates, as a first propagation time, the propagation time of the ultrasonic waves propagated through the ultrasonic conductor 48 from the waveform information that is obtained when the ultrasonic waves generated by the one of the ultrasonic vibrators 46 are observed by the other of the ultrasonic vibrators 46. At the same time, the ultrasonic wave propagation time calculator 62 calculates, as a second propagation time, the propagation time of the ultrasonic waves propagated through the liquid from the waveform information. Furthermore, the ultrasonic wave propagation time calculator 62 calculates, as a third propagation time, the propagation time of the ultrasonic waves propagated through the liquid from the waveform information that is obtained when the ultrasonic waves generated by the other of the ultrasonic vibrators 46 are observed by the one of the ultrasonic vibrators 46. The ultrasonic wave propagation time calculator 62 is connected to the first ultrasonic wave propagation speed calculator 64, and sends the calculated first propagation time to the first ultrasonic wave propagation speed calculator 64. The first ultrasonic wave propagation speed calculator 64 calculates the propagation speed of the ultrasonic waves in the ultrasonic conductor 48 from the first propagation time and the length of a propagation path through the ultrasonic conductor 48 for the ultrasonic waves.

The first ultrasonic wave propagation speed calculator 64 is connected to the temperature calculator 72, and sends the calculated propagation speed of the ultrasonic waves in the ultrasonic conductor 48 to the temperature calculator 72. The temperature calculator 72 is connected to the first relationship register 68. In the first relationship register 68, there is preregistered the relationship between propagation speeds of ultrasonic waves in the ultrasonic conductor 48 and temperatures of the ultrasonic conductor 48. The propagation speed of ultrasonic waves that are propagated in the ultrasonic conductor 48 varies depending on the temperature of the ultrasonic conductor 48. A test was conducted in advance on the ultrasonic conductor 48 for the relationship between temperatures and propagation speeds of ultrasonic waves propagated in the ultrasonic conductor 48, and the relationship obtained by the test has been registered in the first relationship register 68. The test was carried out before the measuring instrument 42 is disposed on the pipe 38, for example. In the test, the temperature of the ultrasonic conductor 48 was varied and propagation speeds of ultrasonic waves that were propagated in the ultrasonic conductor 48 were measured. Alternatively, with the measuring instrument 42 disposed on the pipe 38, a plurality of liquids at known temperatures were supplied to the pipe 38 to vary the temperature of the ultrasonic conductor 48, and propagation speeds of ultrasonic waves that were propagated in the ultrasonic conductor 48 were measured.

The temperature calculator 72 calculates the temperature of the ultrasonic conductor 48 from the relationship between the propagation speed of ultrasonic waves in the ultrasonic conductor 48, calculated by the first ultrasonic wave propagation speed calculator 64, and the relationship registered in the first relationship register 68. Since the ultrasonic conductor 48 is held in contact with the liquid flowing in the pipe 38, the temperature of the ultrasonic conductor 48 is regarded as agreeing with the temperature of the liquid. Therefore, the temperature calculator 72 can calculate the temperature of the ultrasonic conductor 48 as the temperature of the liquid.

The ultrasonic wave propagation time calculator 62 is connected to the second ultrasonic wave propagation speed calculator 66, and sends the calculated second propagation time and the calculated third propagation time to the second ultrasonic wave propagation speed calculator 66. Specifically, the propagation time of the ultrasonic waves propagated from the downstream side to the upstream side in the liquid flowing in the pipe 38 between the two ultrasonic vibrators 46 and the propagation time of the ultrasonic waves propagated from the upstream side to the downstream side in the liquid flowing in the pipe 38 between the two ultrasonic vibrators 46 are sent to the second ultrasonic wave propagation speed calculator 66. The second ultrasonic wave propagation speed calculator 66 calculates the propagation speed of the ultrasonic waves propagated from the downstream side to the upstream side in the liquid flowing in the pipe 38 and a propagation speed of the ultrasonic waves propagated from the upstream side to the downstream side in the liquid flowing in the pipe 38, from the second propagation time, the third propagation time, and the distance between the two ultrasonic vibrators 46. The propagation speed of the ultrasonic waves that are propagated from the downstream side to the upstream side in the liquid flowing in the pipe 38 is reduced by the speed of the liquid flowing in the pipe 38. On the other hand, the propagation speed of the ultrasonic waves that are propagated from the upstream side to the downstream side in the liquid flowing in the pipe 38 is increased by the speed of the liquid flowing in the pipe 38. The second ultrasonic wave propagation speed calculator 66 then calculates the average of the propagation speed of the ultrasonic waves that are propagated upstream in the liquid and the propagation speed of the ultrasonic waves that are propagated downstream in the liquid, as the propagation speed of the ultrasonic waves in the liquid that is not flowing.

The concentration calculator 78 is connected to the second ultrasonic wave propagation speed calculator 66, the temperature calculator 72, and the second relationship register 70. The concentration calculator 78 receives the propagation speed of the ultrasonic waves in the liquid, which is calculated by the second ultrasonic wave propagation speed calculator 66, the temperature of the liquid calculated by the temperature calculator 72, and the relationship registered in the second relationship register 70. The propagation speed of the ultrasonic waves that are propagated in the liquid varies depending on the temperature of the liquid and the concentration of the liquid. The higher the temperature of the liquid is, the greater the propagation speed of the ultrasonic waves that are propagated in the liquid is. In addition, the higher the concentration of a substance dissolved in or mixed with the liquid is, the greater the propagation speed of the ultrasonic waves that are propagated in the liquid is. In the second relationship register 70, there has been registered the relationship between temperatures of the liquid, propagation speeds of the ultrasonic waves in the liquid, and concentrations of a substance dissolved in or mixed with the liquid. The concentration calculator 78 calculates the concentration of the liquid flowing in the pipe 38 from the received propagation speed of the ultrasonic waves in the liquid and the received temperature of the liquid based on the relationship preregistered in the second relationship register 70.

The ultrasonic wave propagation time calculator 62 is connected to the flow speed calculator 74, and sends the calculated second propagation time and the calculated third propagation time to the flow speed calculator 74. Specifically, the propagation time of the ultrasonic waves propagated from the downstream side to the upstream side in the liquid flowing in the pipe 38 between the two ultrasonic vibrators 46 and the propagation time of the ultrasonic waves propagated from the upstream side to the downstream side in the liquid flowing in the pipe 38 between the two ultrasonic vibrators 46 are sent to the flow speed calculator 74. The flow speed calculator 74 calculates the propagation speed of the ultrasonic waves propagated from the downstream side to the upstream side in the liquid flowing in the pipe 38 and a propagation speed of the ultrasonic waves propagated from the upstream side to the downstream side in the liquid flowing in the pipe 38, from the second propagation time, the third propagation time, and the distance between the two ultrasonic vibrators 46. Alternatively, the flow speed calculator 74 obtains both propagation speeds from the second ultrasonic wave propagation speed calculator 66. The propagation speed of the ultrasonic waves that are propagated from the downstream side to the upstream side in the liquid flowing in the pipe 38 is reduced by the speed of the liquid flowing in the pipe 38. On the other hand, the propagation speed of the ultrasonic waves that are propagated from the upstream side to the downstream side in the liquid flowing in the pipe 38 is increased by the speed of the liquid flowing in the pipe 38. The flow speed calculator 74 calculates one-half of the difference between the propagation speed of the ultrasonic waves that are propagated upstream in the liquid and the propagation speed of the ultrasonic waves that are propagated downstream in the liquid, as the flow speed of the liquid flowing in the pipe 38.

The flow rate calculator 76 is connected to the flow speed calculator 74. The flow speed calculator 74 sends the calculated flow speed of the liquid flowing in the pipe 38 to the flow rate calculator 76. The flow rate calculator 76 multiplies the inner cross-sectional area of the pipe 38 along a plane that crosses the pipe 38 perpendicularly to the direction in which the liquid flows, by the flow speed of the liquid, thereby calculating a flow rate of the liquid flowing in the pipe 38.

The controller 52 may be connected to a display unit, not depicted, and may transmit information representing the temperature, concentration, flow speed, flow rate, etc. of the liquid that have been obtained from the measuring instrument 42 to the display unit, so that the information can be displayed by the display unit. The controller 52 may also be connected to a recording unit, not depicted, so that the information can be recorded by the recording unit. Some or all of the configurations and functions of the controller 52 may be implemented on a computer by software.

A process for calculating the temperature, concentration, flow speed, flow rate, etc. of the liquid by the measuring instrument 42 disposed on the pipe 38 will be described below. First, the controller 52 of the measuring instrument 42 controls each of the two ultrasonic vibrators 46 of the measuring instrument 42 to generate ultrasonic waves, and also controls each of the two ultrasonic vibrators 46 to observe the ultrasonic waves from the other ultrasonic vibrator 46. Each of the two ultrasonic vibrators 46 converts the observed ultrasonic waves into an electric signal and sends the electric signal to the ultrasonic wave propagation time calculator 62 of the calculation block 60.

Figure 4A:
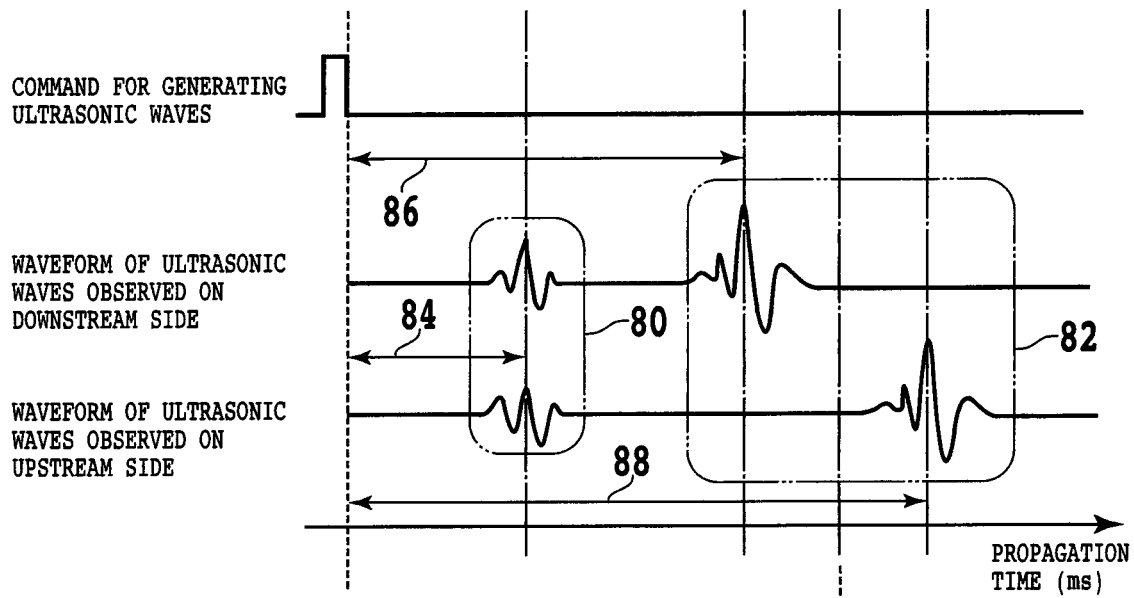
FIG. 4A is a graph depicting an example of the waveforms of ultrasonic waves observed by ultrasonic vibrators.

FIG. 4A depicts an example of the waveforms of ultrasonic waves observed by the ultrasonic vibrators 46 of the measuring instrument 42. The horizontal axis of FIG. 4A represents the elapse of time. FIG. 4A illustrates the timing of a command for generating ultrasonic waves, the waveform of the ultrasonic waves observed by the ultrasonic vibrator 46 on the downstream side, and the waveform of the ultrasonic waves observed by the ultrasonic vibrator 46 on the upstream side. The two waveforms of the ultrasonic waves depicted in FIG. 4A may be acquired individually. As depicted in FIG. 4A, the waveform of the ultrasonic waves observed by the ultrasonic vibrator 46 on the downstream side and the waveform of the ultrasonic waves observed by the ultrasonic vibrator 46 on the upstream side include waveforms 80 of the ultrasonic waves propagated through the ultrasonic conductor 48 and waveforms 82 of the ultrasonic waves propagated through the liquid. Since the propagation speed of the ultrasonic waves in the ultrasonic conductor 48 is higher than the propagation speed of the ultrasonic waves in the liquid, the waveforms 80 of the ultrasonic waves propagated through the ultrasonic conductor 48 are observed earlier than the waveforms 82 of the ultrasonic waves propagated through the liquid.

Inasmuch as the ultrasonic conductor 48 is fixed to the pipe 38, as depicted in FIG. 4A, the propagation time of the ultrasonic waves that are propagated upstream through the ultrasonic conductor 48 between the two ultrasonic vibrators 46 and the propagation time of the ultrasonic waves that are propagated downstream through the ultrasonic conductor 48 between the two ultrasonic vibrators 46 are the same as each other. The ultrasonic wave propagation time calculator 62 calculates, as a first propagation time 84, the propagation time of the ultrasonic waves generated by one of the two ultrasonic vibrators 46, propagated through the ultrasonic conductor 48, and observed by the other of the two ultrasonic vibrators 46. Then, a propagation speed of the ultrasonic waves in the ultrasonic conductor 48 is calculated from the calculated first propagation time 84 and the length of the ultrasonic conductor 48 that serves as a propagation path for the ultrasonic waves. The temperature of the liquid that is held in contact with the ultrasonic conductor 48 is calculated by calculating the temperature of the ultrasonic conductor 48 from the calculated propagation speed of the ultrasonic waves in the ultrasonic conductor 48 and the relationship registered in the first relationship register 68.

As depicted in FIG. 4A, since the liquid flows in the pipe 38, the propagation time, i.e., a second propagation time 86, of the ultrasonic waves that are propagated downstream in the liquid between the two ultrasonic vibrators 46 and the propagation time, i.e., a third propagation time 88, of the ultrasonic waves that are propagated upstream in the liquid between the two ultrasonic vibrators 46 are different from each other. A propagation speed of the ultrasonic waves that are propagated downstream in the liquid flowing in the pipe 38 and a propagation speed of the ultrasonic waves that are propagated upstream in the liquid flowing in the pipe 38 are calculated from the distance between the two ultrasonic vibrators 46, the second propagation time 86, and the third propagation time 88. An average of the propagation speed of the ultrasonic waves that are propagated downstream in the liquid flowing in the pipe 38 and the propagation speed of the ultrasonic waves that are propagated upstream in the liquid flowing in the pipe 38 represents the propagation speed of the ultrasonic waves that are propagated in the liquid that is not flowing. The difference between the propagation speed of the ultrasonic waves that are propagated downstream or upstream in the liquid and the propagation speed of the ultrasonic waves that are propagated in the liquid that is not flowing represents the flow speed of the liquid flowing in the pipe 38. The flow speed of the liquid is multiplied by the cross-sectional area of the pipe 38, thereby calculating a flow rate per unit time of the liquid.

Figure 5:
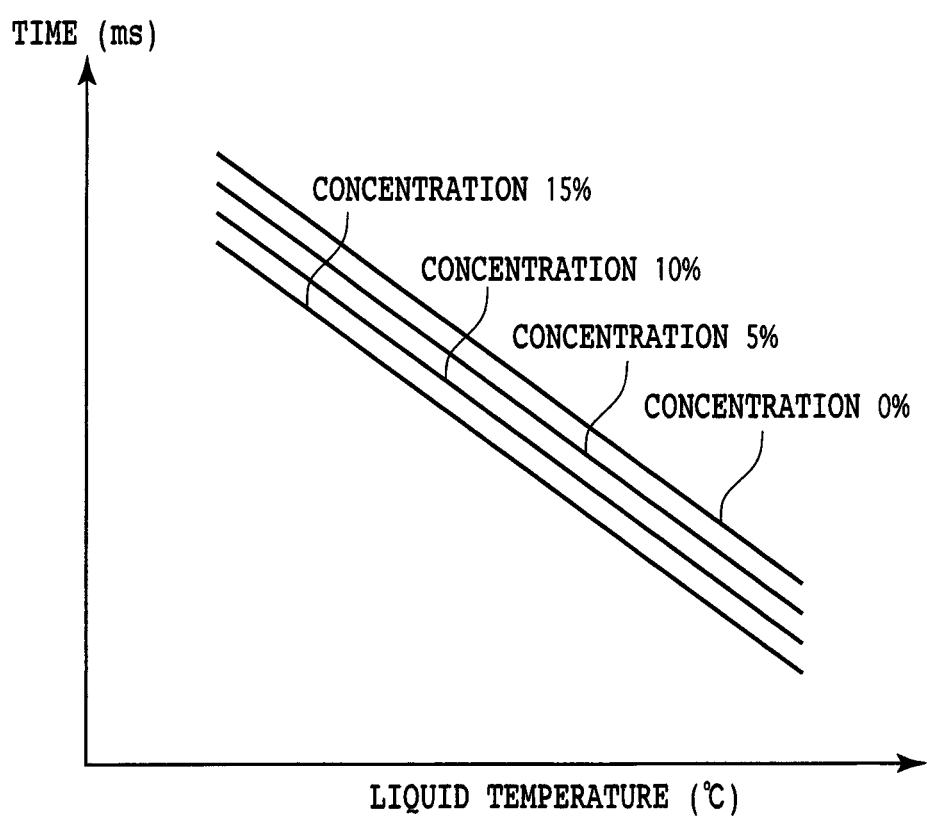
FIG. 5 is a graph schematically depicting an example of the relationship between concentrations of a liquid, temperatures of the liquid, and propagation speeds of ultrasonic waves propagated in the liquid.

The concentration of a substance dissolved or dispersed in the liquid can be calculated from the calculated propagation speed of the ultrasonic waves that are propagated in the liquid and the calculated temperature of the liquid. FIG. 5 is a graph schematically depicting an example of the relationship between temperatures of the liquid, propagation times of ultrasonic waves in the liquid, and concentrations of a substance dissolved in or mixed with the liquid, the relationship being registered in the second relationship register 70 of the calculation block 60. For the sake of convenience, the propagation times depicted in FIG. 5 are converted from the propagation speeds of ultrasonic waves in the liquid by dividing the length of the propagation path for the ultrasonic waves thereby. The relationship is uniquely determined by the type of the liquid and the type of the substance contained in the liquid. Using the relationship depicted in FIG. 5, the concentration of the substance dissolved or dispersed in the liquid can be calculated from the propagation speed, i.e., the propagation time, of the ultrasonic waves propagated in the liquid and the temperature of the liquid.

As described above, the temperature, concentration, flow speed, and flow rate of the liquid flowing in the pipe 38 on which the measuring instrument 42 according to the present embodiment is disposed can be calculated from the waveforms of the ultrasonic waves depicted in FIG. 4A which are obtained by the measuring instrument 42.

Figure 4B:
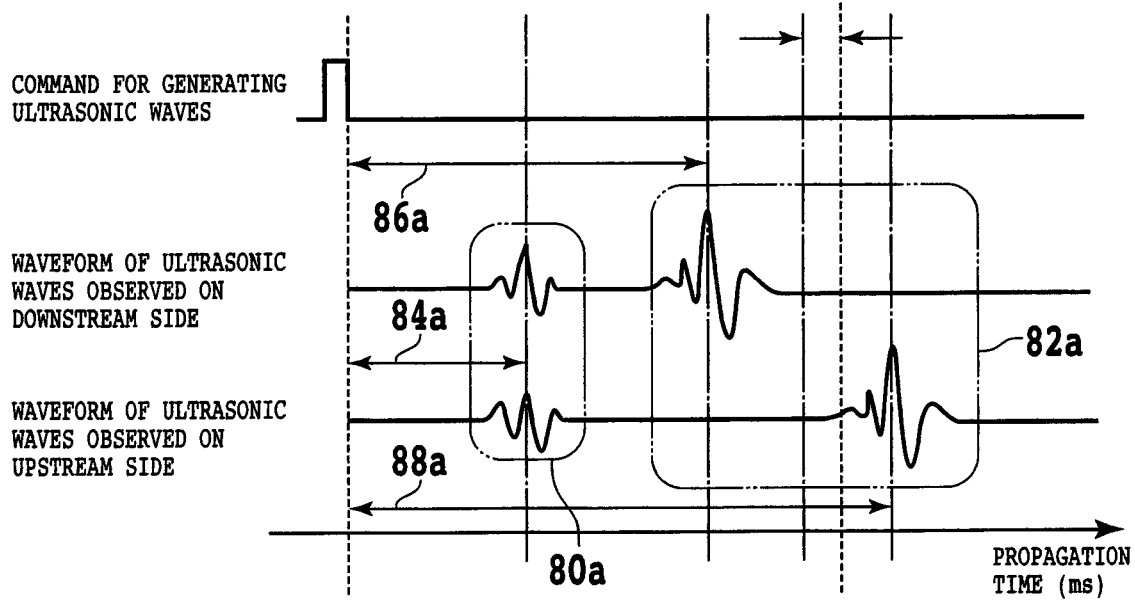
FIG. 4B is a graph depicting another example of the waveforms of ultrasonic waves observed by the ultrasonic vibrators.

FIG. 4B depicts another example of the waveforms of ultrasonic waves observed by the measuring instrument 42. The type of the liquid flowing in the pipe 38 and the type of the substance contained in the liquid when the waveforms depicted in FIG. 4B are obtained are the same as the type of the liquid flowing in the pipe 38 and the type of the substance contained in the liquid when the waveforms depicted in FIG. 4A are obtained. A comparison between FIGS. 4A and 4B indicates that the first propagation times 84 and 84a at which the waveforms 80 and 80a of the ultrasonic waves propagated in the ultrasonic conductor appear are the same as each other. Therefore, it can be understood that the temperature of the liquid flowing in the pipe 38 remains the same when the waveforms depicted in FIG. 4A and the waveforms depicted in FIG. 4B are obtained. On the other hand, the second propagation times 86 and 86a at which the waveforms 82 and 82a of the ultrasonic waves propagated in the liquid appear and the third propagation times 88 and 88a are different from each other. With the waveforms depicted in FIG. 4B, the second propagation time 86a and the third propagation time 88a are relatively short. Therefore, it can be understood that the concentration of the liquid flowing in the pipe 38 when the waveforms depicted in FIG. 4B are obtained is higher than the concentration of the liquid flowing in the pipe 38 when the waveforms depicted in FIG. 4A are obtained.

Figure 6:
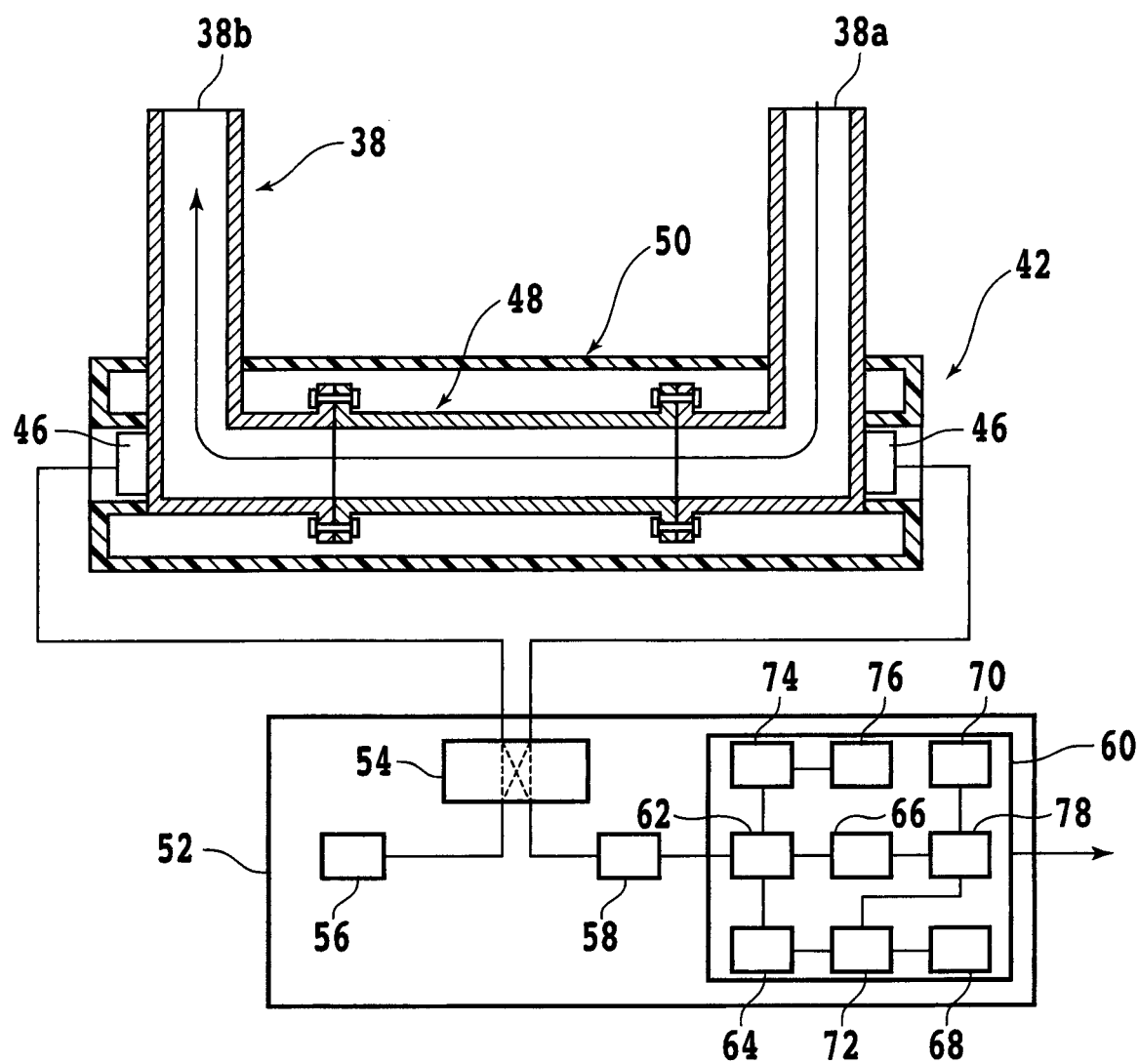
FIG. 6 is a cross-sectional view, partly in block form, schematically depicting a measuring instrument, disposed on a pipe, according to a modification of the present invention.

A modification of the measuring instrument 42 according to the present embodiment will be described below. FIG. 6 is a cross-sectional view, partly in block form, schematically depicting a modified measuring instrument 42. The modified measuring instrument 42 depicted in FIG. 6 is basically of the same structure as the measuring instrument 42 depicted in FIG. 3 except for an ultrasonic conductor 48. The ultrasonic conductor 48 depicted in FIG. 6 is an annular member that makes up an inner wall of the pipe 38 between the two ultrasonic vibrators 46. The ultrasonic conductor 48 is covered in a cover member 50 that restrains the transfer of heat from an external atmosphere in which the measuring instrument 42 is placed. Therefore, the temperature of the ultrasonic conductor 48 is essentially the same as the temperature of the liquid flowing in the pipe 38.

Ultrasonic waves generated by one of the two ultrasonic vibrators 46 are propagated to the liquid flowing in the pipe 38 and then reach one end of the ultrasonic conductors 48. The ultrasonic waves are then propagated from the one end of the ultrasonic conductor 48 to the other end thereof, and then to the liquid flowing in the pipe 38, after which the ultrasonic waves reach the other ultrasonic vibrator 46 and are observed thereby. Since the propagation speed of the ultrasonic waves in the ultrasonic conductor 48 is higher than the propagation speed of the ultrasonic waves in the liquid, the ultrasonic waves propagated through the ultrasonic conductor 48 are observed by the other ultrasonic vibrator 46 earlier than the ultrasonic waves propagated only through the liquid.

Figure 7:
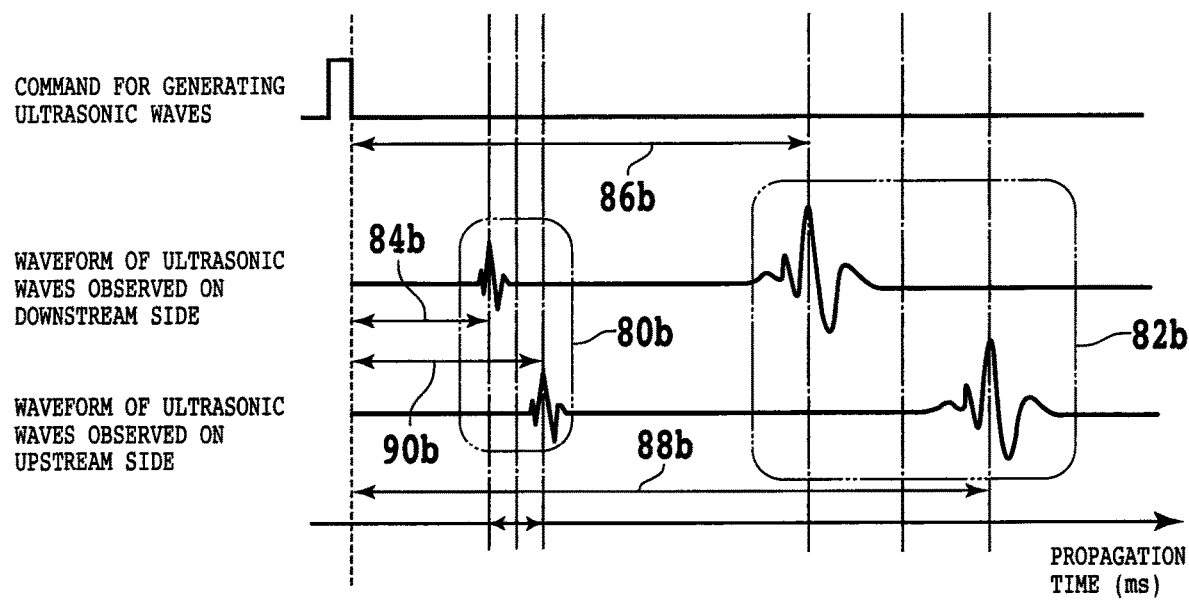
FIG. 7 is a graph depicting an example of the waveforms of ultrasonic waves observed by ultrasonic vibrators of the measuring instrument depicted in FIG. 6.

A process of measuring the liquid flowing in the pipe 38 by the measuring instrument 42 depicted in FIG. 6 will be described below with reference to FIG. 7. FIG. 7 is a graph depicting an example of the waveforms of ultrasonic waves observed by the ultrasonic vibrators 46 of the measuring instrument 42 depicted in FIG. 6. The horizontal axis of FIG. 7 represents the elapse of time. FIG. 7 illustrates the timing of a command for generating ultrasonic waves, the waveform of the ultrasonic waves observed by the ultrasonic vibrator 46 on the downstream side, and the waveform of the ultrasonic waves observed by the ultrasonic vibrator 46 on the upstream side. The two waveforms of the ultrasonic waves depicted in FIG. 7 may be acquired individually. Unlike the waveforms of the ultrasonic waves depicted in FIG. 4A, the waveforms of the ultrasonic waves depicted in FIG. 7 include different waveforms 80*b* of ultrasonic waves propagated through the ultrasonic conductor 48 and observed by the ultrasonic vibrator 46 on the downstream side 38*b* and ultrasonic waves propagated through the ultrasonic conductor 48 and observed by the ultrasonic vibrator 46 on the upstream side 38*a*. In the measuring instrument 42 depicted in FIG. 6, the ultrasonic waves propagated through the ultrasonic conductor 48 are propagated through the liquid flowing in the pipe 38 before and after the propagation through the ultrasonic conductor 48.

The propagation time in which the ultrasonic waves are generated by the ultrasonic vibrator 46 on the upstream side 38*a*, propagated through the ultrasonic conductor 48, and observed by the ultrasonic vibrator 46 on the downstream side 38*b* will be referred to as a first propagation time 84*b*, and the propagation time in which the ultrasonic waves are generated by the ultrasonic vibrator 46 on the downstream side 38*b*, propagated through the ultrasonic conductor 48, and observed by the ultrasonic vibrator 46 on the upstream side 38*a* will be referred to as a fourth propagation time 90*b*. The first propagation time 84*b* is shorter than the fourth propagation time 90*b*. First, the propagation time of the ultrasonic waves that are propagated downstream in the liquid flowing in the pipe 38 and the propagation time of the ultrasonic waves that are propagated upstream in the liquid flowing in the pipe 38 are calculated using a second propagation time 86*b* and a third propagation time 88*b* that are similar to the second propagation times 86 and 86*a* and the third propagation times 88 and 88*a*, respectively, depicted in FIGS. 4A and 4B. Then, the propagation speed of the ultrasonic waves in the ultrasonic conductor 48 is calculated from the first propagation time 84*b*, the length of the propagation path for the ultrasonic waves, the fourth propagation time 90*b*, the propagation speed of the ultrasonic waves that are propagated downstream in the liquid, and the propagation speed of the ultrasonic waves that are propagated upstream in the liquid.

In addition, the temperature of the liquid that is held in contact with the ultrasonic conductor 48 is calculated by calculating the temperature of the ultrasonic conductor 48 from the calculated propagation speed of the ultrasonic waves in the ultrasonic conductor 48 and the relationship registered in the first relationship register 68. As with the measuring instrument 42 depicted in FIG. 3, the measuring instrument 42 depicted in FIG. 6 can calculate the flow speed and flow rate of the liquid flowing in the pipe 38. Furthermore, the measuring instrument 42 depicted in FIG. 6 can calculate the propagation speed of the ultrasonic waves propagated in the liquid that is at rest from the propagation speed of the ultrasonic waves that are propagated downstream in the liquid flowing in the pipe 38 and the propagation speed of the ultrasonic waves that are propagated upstream in the liquid flowing in the pipe 38. The measuring instrument 42 depicted in FIG. 6 can calculate the concentration of the substance dissolved or dispersed in the liquid from the propagation speed, i.e., the propagation time, of the ultrasonic waves propagated in the liquid at rest, the temperature of the liquid, and the relationship registered in the second relationship register 70.

As described above, the measuring instrument according to the present embodiment calculates the temperature, concentration, flow speed, and flow rate of the liquid flowing in the pipe. Specifically, there is provided in accordance with an aspect of the present invention a measuring instrument that functions as both an ultrasonic flowmeter disposed on a pipe and a thermometer. A processing apparatus with such a pipe often makes it difficult to dispose a thermometer in addition to an ultrasonic flowmeter on the pipe. However, since the measuring instrument according to the aspect of the present invention can be disposed in place of an ultrasonic flowmeter on the pipe, the measuring instrument can easily be disposed in a limited space in the processing apparatus.

The present invention is not limited to the embodiment described above, but various changes and modifications may be made therein. Though the aspect of the present invention is concerned with a measuring instrument disposed on a pipe through which a liquid flows in a processing apparatus, another aspect of the present invention may be directed to a processing apparatus that incorporates such a measuring instrument. In the above embodiment, the measuring instrument is disposed on a pipe in a polishing apparatus. However, a processing apparatus that incorporates the measuring instrument therein is not limited to a polishing apparatus. For example, a grinding apparatus for grinding a workpiece and a cutting apparatus for cutting a workpiece also include pipes through which various liquids flow in order to be supplied to a workpiece and a processing unit. Therefore, the measuring instrument according to the present invention can be disposed on the pipes in the grinding apparatus and the cutting apparatus.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A measuring instrument adapted to be disposed on a pipe through which a liquid flows, comprising:
    two ultrasonic vibrators disposed on an upstream side and a downstream side of the pipe;
    an ultrasonic conductor disposed between the two ultrasonic vibrators and held in contact with the liquid; and
    a controller electrically connected to the two ultrasonic vibrators,
wherein the controller includes
    a first relationship register registering therein a relationship between propagation speeds of ultrasonic waves in the ultrasonic conductor and temperatures of the ultrasonic conductor,
    an ultrasonic wave propagation time calculator,
    a first ultrasonic wave propagation speed calculator, and
    a temperature calculator,
the ultrasonic wave propagation time calculator calculates a propagation time of ultrasonic waves propagated in the ultrasonic conductor as a first propagation time from waveform information that is obtained when the ultrasonic waves are generated by one of the two ultrasonic vibrators, propagated through the ultrasonic conductor, and observed by the other of the two ultrasonic vibrators,
the first ultrasonic wave propagation speed calculator calculates a propagation speed of the ultrasonic waves in the ultrasonic conductor, using the first propagation time and a length of a propagation path for the ultrasonic waves, and
the temperature calculator derives a temperature of the liquid held in contact with the ultrasonic conductor by calculating the temperature of the ultrasonic conductor from the calculated propagation speed of the ultrasonic waves in the ultrasonic conductor and the relationship registered in the first relationship register.

2. The measuring instrument according to claim 1, wherein the controller further includes
    a second relationship register registering therein a relationship between temperatures of the liquid, propagation speeds of ultrasonic waves in the liquid, and concentrations of a substance dissolved in or mixed with the liquid,
    a second ultrasonic wave propagation speed calculator, and
    a concentration calculator,
the ultrasonic wave propagation time calculator calculates the first propagation time and calculates a propagation time of ultrasonic waves as a second propagation time when the ultrasonic waves are generated by the one of the two ultrasonic vibrators, propagated through the liquid, and observed by the other of the two ultrasonic vibrators,
the ultrasonic wave propagation time calculator calculates a propagation time of ultrasonic waves propagated in the liquid as a third propagation time from waveform information that is obtained when the ultrasonic waves are generated by the other of the two ultrasonic vibrators, propagated through the liquid, and observed by the one of the two ultrasonic vibrators,
the second ultrasonic wave propagation speed calculator calculates a propagation speed of the ultrasonic waves in the liquid from the second propagation time, the third propagation time, and a distance between the two ultrasonic vibrators, and
the concentration calculator calculates the concentration of the substance in the liquid from the temperature of the liquid calculated by the temperature calculator, the propagation speed of the ultrasonic waves in the liquid calculated by the second ultrasonic wave propagation speed calculator, and the relationship registered in the second relationship register.

3. The measuring instrument according to claim 2, wherein the controller further includes
    a flow speed calculator, and
    a flow rate calculator,
the flow speed calculator calculates a flow speed of the liquid in the pipe, using the second propagation time, the third propagation time, and the distance between the two ultrasonic vibrators, and
the flow rate calculator calculates a flow rate of the liquid from the flow speed of the liquid in the pipe calculated by the flow speed calculator and a cross-sectional area of the pipe.

4. The measuring instrument according to claim 1, wherein the ultrasonic conductor is an annular member that makes up an inner wall of the pipe between the two ultrasonic vibrators, and
the annular member is covered in a cover member that restrains transfer of heat from an external atmosphere in which the pipe is disposed.

5. The measuring instrument according to claim 1, wherein the ultrasonic conductor is an elongate member extending in the pipe between the two ultrasonic vibrators, and
the ultrasonic conductor is disposed such that a surface thereof is held in contact with the liquid.

6. A processing apparatus comprising:
    a measuring instrument disposed on a pipe through which a liquid flows;
    a chuck table; and
    a processing tool,
wherein the measuring instrument includes
    two ultrasonic vibrators disposed on an upstream side and a downstream side of the pipe,
    an ultrasonic conductor disposed between the two ultrasonic vibrators and held in contact with the liquid, and
    a controller electrically connected to the two ultrasonic vibrators;
the controller includes
    a first relationship register registering therein a relationship between propagation speeds of ultrasonic waves in the ultrasonic conductor and temperatures of the ultrasonic conductor,
    an ultrasonic wave propagation time calculator,
    a first ultrasonic wave propagation speed calculator, and
    a temperature calculator,
the ultrasonic wave propagation time calculator calculates a propagation time of ultrasonic waves propagated in the ultrasonic conductor as a first propagation time from waveform information that is obtained when the ultrasonic waves are generated by one of the two ultrasonic vibrators, propagated through the ultrasonic conductor, and observed by the other of the two ultrasonic vibrators,
the first ultrasonic wave propagation speed calculator calculates a propagation speed of the ultrasonic waves in the ultrasonic conductor, using the first propagation time and a length of a propagation path for the ultrasonic waves, the temperature calculator derives a temperature of the liquid held in contact with the ultrasonic conductor by calculating the temperature of the ultrasonic conductor from the calculated propagation speed of the ultrasonic waves in the ultrasonic conductor and the relationship registered in the first relationship register, and the processing tool processes a workpiece held on the chuck table while the liquid whose flow rate and concentration have been measured by the measuring instrument is being supplied to the workpiece.

* * * * *